US010988326B2

(12) United States Patent
Smith et al.

(10) Patent No.: US 10,988,326 B2
(45) Date of Patent: Apr. 27, 2021

(54) LOAD ASSIST SYSTEM

(71) Applicants: INTELLIGRATED HEADQUARTERS, LLC, Mason, OH (US); EuroSort, Inc., Owings Mills, MD (US)

(72) Inventors: Jared Smith, Rosedale, MD (US); Darius Scott, Baltimore, MD (US); Erik Brewer, Taneytown, MD (US); Jeff Zerr, Morris Plains, NJ (US)

(73) Assignees: Intelligrated Headquarters, LLC, Mason, OH (US); Eurosort, Inc., Owings Mills, MD (US)

( * ) Notice: Subject to any disclaimer, the term of this patent is extended or adjusted under 35 U.S.C. 154(b) by 0 days.

(21) Appl. No.: 16/407,789

(22) Filed: May 9, 2019

(65) Prior Publication Data

US 2020/0354158 A1    Nov. 12, 2020

(51) Int. Cl.
| B65G 47/82 | (2006.01) |
| B65G 47/64 | (2006.01) |
| B65G 13/00 | (2006.01) |

(52) U.S. Cl.
CPC .......... *B65G 47/642* (2013.01); *B65G 13/00* (2013.01)

(58) Field of Classification Search
USPC .......... 198/370.07, 572, 575, 718, 747, 748
See application file for complete search history.

(56) References Cited

U.S. PATENT DOCUMENTS

| 1,631,125 | A | * | 6/1927 | Happel | ..................... | F25C 5/14 |
| | | | | | | 198/748 |
| 1,858,619 | A | * | 5/1932 | Delamere | .............. | B65G 47/57 |
| | | | | | | 198/575 |
| 2,891,659 | A | * | 6/1959 | Westeren | .................. | F27B 9/26 |
| | | | | | | 198/748 |
| 3,036,692 | A | * | 5/1962 | Kiefer, Sr. | ............. | B65G 47/82 |
| | | | | | | 198/464.3 |

(Continued)

FOREIGN PATENT DOCUMENTS

| JP | 06-115618 A | 4/1994 |
| JP | 06-171741 A | 6/1994 |

(Continued)

OTHER PUBLICATIONS

Extended European Search Report issued in European Application No. 20173347.4, dated Oct. 1, 2020 (7 pages).

*Primary Examiner* — Joseph A Dillon, Jr.
(74) *Attorney, Agent, or Firm* — Alston & Bird LLP

(57) ABSTRACT

The present disclosure relates to a load assist module for transferring articles onto a downstream conveyor. The load assist module may include a roller conveyor having one or more rollers that together define a conveyor plane, such that the one or more rollers may be actuatable to convey the article along the conveyor plane in a direction of a downstream conveyor. The load assist module may further include a pusher assembly positioned adjacent the conveyor plane. The pusher assembly may include a track-guided vertical popup with a base and a pop-up. The pop-up may be actuatable such that the pop-up extends through the conveyor plane to contact the article. The pusher assembly may drive the track-guided vertical popup toward the direction of the downstream conveyor such that the track-guided vertical popup pushes the article.

17 Claims, 7 Drawing Sheets

(56) References Cited

U.S. PATENT DOCUMENTS

| | | | | | |
|---|---|---|---|---|---|
| 3,362,519 | A | * | 1/1968 | Skarin | B65G 47/82 198/464.1 |
| 3,794,158 | A | * | 2/1974 | Greenwood, Jr. | B65G 25/02 198/718 |
| 3,993,200 | A | * | 11/1976 | Ide | B63B 27/22 414/140.8 |
| 4,364,468 | A | * | 12/1982 | Hetra, Jr. | C23C 2/385 198/468.6 |
| 4,465,177 | A | * | 8/1984 | Dorner | B65G 47/57 198/475.1 |
| 6,179,109 | B1 | * | 1/2001 | Haldimann | B65G 1/06 193/2 R |
| 6,843,361 | B2 | * | 1/2005 | Maingonnat | B65G 47/82 198/437 |
| 8,893,873 | B1 | * | 11/2014 | Harris | B65G 25/00 198/345.1 |
| 10,421,616 | B2 | * | 9/2019 | Hatanaka | B65G 23/08 |
| 2004/0238326 | A1 | * | 12/2004 | Lichti | B65G 17/123 198/475.1 |
| 2005/0225028 | A1 | | 10/2005 | Lawless et al. | |
| 2005/0247540 | A1 | | 11/2005 | Brannon | |
| 2007/0051585 | A1 | * | 3/2007 | Scott | B65G 47/82 198/370.07 |
| 2008/0087711 | A1 | * | 4/2008 | Schreiber | B21D 51/2692 228/176 |
| 2018/0037410 | A1 | | 2/2018 | DeWitt | |
| 2019/0315575 | A1 | * | 10/2019 | Middelberg | B65G 47/82 |
| 2020/0087081 | A1 | * | 3/2020 | Green | B65G 47/52 |
| 2020/0283241 | A1 | * | 9/2020 | Quaglia | B65G 47/57 |

FOREIGN PATENT DOCUMENTS

| | | |
|---|---|---|
| JP | 2001-341834 A | 12/2001 |
| JP | 2016-037368 A | 3/2016 |

* cited by examiner

LOAD ASSIST SYSTEM

TECHNOLOGICAL FIELD

Example embodiments of the present invention relate generally to material handling systems, and more particularly, to systems for transferring articles to a downstream system.

BACKGROUND

In a high-volume distribution and fulfillment center, material handling systems, such as conveyors, vertical conveyors, and the like, are generally used to convey articles, such as, totes, containers, cartons, and the like, for further handling and/or processing. Thus, in a distribution and fulfillment center, articles are regularly transferred from one material handling system to another throughout the processing cycle of the article. Applicant has identified several technical challenges associated with loading of the articles from one material handling system to a downstream system. Through applied effort, ingenuity, and innovation, many of these identified challenges have been overcome by developing solutions that are included in embodiments of the present invention, many examples of which are described in detail herein.

BRIEF SUMMARY

The illustrative embodiments of the present disclosure relate to systems and methods for loading articles in a material handling environment. According to at least one aspect of the present disclosure, a load assist module for transferring an article onto a downstream conveyor is provided. The load assist module may include a roller conveyor having one or more rollers that together define a conveyor plane, such that the one or more rollers may be actuatable to convey the article along the conveyor plane in a direction of a downstream conveyor. The load assist module may further include a pusher assembly that may be positioned adjacent to the conveyor plane. The pusher assembly may include a track-guided vertical popup with a base and a pop-up, the pop-up may be actuatable such that the pop-up extends through the conveyor plane to contact the article. Further, the pusher assembly may drive the track-guided vertical popup toward the direction of the downstream conveyor such that the track-guided vertical popup may push the article.

According to one or more embodiments of the present disclosure, the pusher assembly may further include a drive assembly operatively coupled to the track-guided vertical popup. The drive assembly may drive the track-guided vertical popup in a first direction, towards the downstream conveyor, to transfer the article onto the downstream conveyor, and may drive the track-guided vertical popup in a second direction, away from the downstream conveyor, once the article is transferred onto the downstream conveyor. In an embodiment, the drive assembly may include a timing belt driven by a pair of roller mounted timing pulleys. The timing belt may be coupled to the track-guided vertical popup for driving the track-guided vertical popup in the first direction and the second direction. In an embodiment, the drive assembly may further include a flag coupled to the timing belt such that the flag moves in a direction opposite to a direction of movement of the track-guided vertical popup. In another embodiment, the drive assembly may include a pneumatic cylinder coupled to the track-guided vertical popup, such that the pneumatic cylinder may extend to drive the track-guided vertical popup in the first direction and may retract to drive the track-guided vertical popup in the second direction.

According to one or more embodiments of the present disclosure, the popup may be vertically movable to extend above the conveyor plane for pushing the article onto the downstream conveyor and retract below the conveyor plane for receiving a next article onto the load assist module.

According to one or more embodiments of the present disclosure, the load assist module may further include one or more pneumatic pop-out stops positioned adjacent to the downstream conveyor, such that the one or more pneumatic pop-out stops may extend to stop the article against the one or more pneumatic pop-out stops until the downstream conveyor may be ready to receive the article.

According to one or more embodiments of the present disclosure, the load assist module may further include a controller operatively coupled to the roller conveyor and the pusher assembly. The controller may receive a notification of a presence of the article on the roller conveyor. In response to the notification, the controller may drive the roller conveyor to convey the article along the conveyor plane towards the downstream conveyor, actuate the pusher assembly to extend the track-guided vertical popup above the conveyor plane such that the track-guided vertical popup may contact the rear end of the article, and actuate the pusher assembly to drive the track-guided vertical popup against the rear end of the article to push the article onto the downstream conveyor.

According to one or more embodiments of the present disclosure, the load assist module may further include one or more guide rails positioned parallel to the conveyor plane for aligning and guiding the article while the article may be conveyed by the roller conveyor.

According to another aspect of the present disclosure, a load assist module is provided. The load assist module may include a roller conveyor having one or more rollers that together define a conveyor plane, the conveyor plane having a first side and a second side, and a pusher assembly that extends along the conveyor plane and is disposed between the one or more rollers. The pusher assembly may include a first wall that extends along the conveyor plane having a first track and a second wall that extends along the conveyor plane having a second track, such that the first wall opposes the second wall, and a body having a first projection on a first body side that is sized to slide within the first track and a second projection on a second body side that is sized to slide with the second track. The body may further include a vertical pop-up that may be actuatable such that in an instance in which the vertical pop-up is actuated the vertical pop-up may extend from the first side of the conveyor plane through the conveyor plane to the second side.

According to another aspect of the present disclosure, a material handling system is provided. The material handling system may include a conveyor for conveying an article in a conveyance direction, and a load assist module positioned adjacent the conveyor for receiving the article from the conveyor. The load assist module may include a roller conveyor having one or more rollers that together define a conveyor plane, such that the one or more rollers may be actuatable to convey the article along the conveyor plane in a direction of a downstream conveyor. The load assist module may further include a pusher assembly that may be positioned adjacent to the conveyor plane. The pusher assembly may include a track-guided vertical popup with a base and a pop-up, the pop-up may be actuatable such that the pop-up extends through the conveyor plane to contact the article. Further, the pusher assembly may drive the track-guided vertical popup toward the direction of the downstream conveyor such that the track-guided vertical popup may push the article.

According to one or more embodiments of the present disclosure, the downstream conveyor may include a vertical conveyor for moving the article vertically across one or more levels.

According to one or more embodiments of the present disclosure, the pusher assembly may further include a drive assembly operatively coupled to the track-guided vertical popup. The drive assembly may drive the track-guided vertical popup in a first direction, towards the downstream conveyor, to transfer the article onto the downstream conveyor, and may drive the track-guided vertical popup in a second direction, away from the downstream conveyor, once the article may be transferred onto the downstream conveyor. In an embodiment, the drive assembly may include a timing belt driven by a pair of roller mounted timing pulleys. The timing belt may be coupled to the track-guided vertical popup for driving the track-guided vertical popup in the first direction and the second direction. In an embodiment, the drive assembly may further include a flag coupled to the timing belt such that the flag moves in a direction opposite to a direction of movement of the track-guided vertical popup. In another embodiment, the drive assembly may include a pneumatic cylinder coupled to the track-guided vertical popup, such that the pneumatic cylinder may extend to drive the track-guided vertical popup in the first direction and may retract to drive the track-guided vertical popup in the second direction.

According to one or more embodiments of the present disclosure, the popup may be vertically movable to extend above the conveyor plane for pushing the article onto the downstream conveyor and retract below the conveyor plane for receiving a next article onto the load assist module.

According to one or more embodiments of the present disclosure, the material handling system may further include a controller operatively coupled to the load assist module. The controller may receive a notification of a presence of the article on the roller conveyor. In response to the notification, the controller may drive the roller conveyor to convey the article along the conveyor plane towards the downstream conveyor, actuate the pusher assembly to extend the track-guided vertical popup above the conveyor plane such that the track-guided vertical popup may contact the rear end of the article, and actuate the pusher assembly to drive the track-guided vertical popup against the rear end of the article to push the article onto the downstream conveyor.

According to another aspect of the present disclosure, a method of operating a load assist module for transferring an article onto a downstream conveyor is provided. The method may include receiving a notification of a presence of the article on a roller conveyor of the load assist module, in response to the notification, driving the roller conveyor to convey the article along a conveyor plane towards the downstream conveyor, actuating a pusher assembly, positioned adjacent the conveyor plane, having a track-guided vertical popup to extend the track-guided vertical popup above the conveyor plane such that the track-guided vertical popup contacts a rear end of the article, and actuating the pusher assembly to drive the track-guided vertical popup against the rear end of the article to push the article onto the downstream conveyor.

According to one or more embodiments of the present disclosure, the method may include receiving a notification of transfer of the article onto the downstream conveyor, in response to the notification, actuating the pusher assembly to retract the track-guided vertical popup adjacent the conveyor plane, and actuating the pusher assembly to drive the track-guided vertical popup away from the downstream conveyor and into the load assist module to an initial position.

According to one or more embodiments of the present disclosure, the method may include receiving a notification of conveyance of the article on the roller conveyor towards the downstream conveyor, actuating one or more pneumatic pop-out stops positioned adjacent to the downstream conveyor, such that the one or more pneumatic pop-out stops may extend to stop the article against the one or more pneumatic pop-out stops, detecting that the downstream conveyor may be ready to receive the article, and actuating the one or more pneumatic pop-out stops to retract to allow the article to be transferred onto the downstream conveyor.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
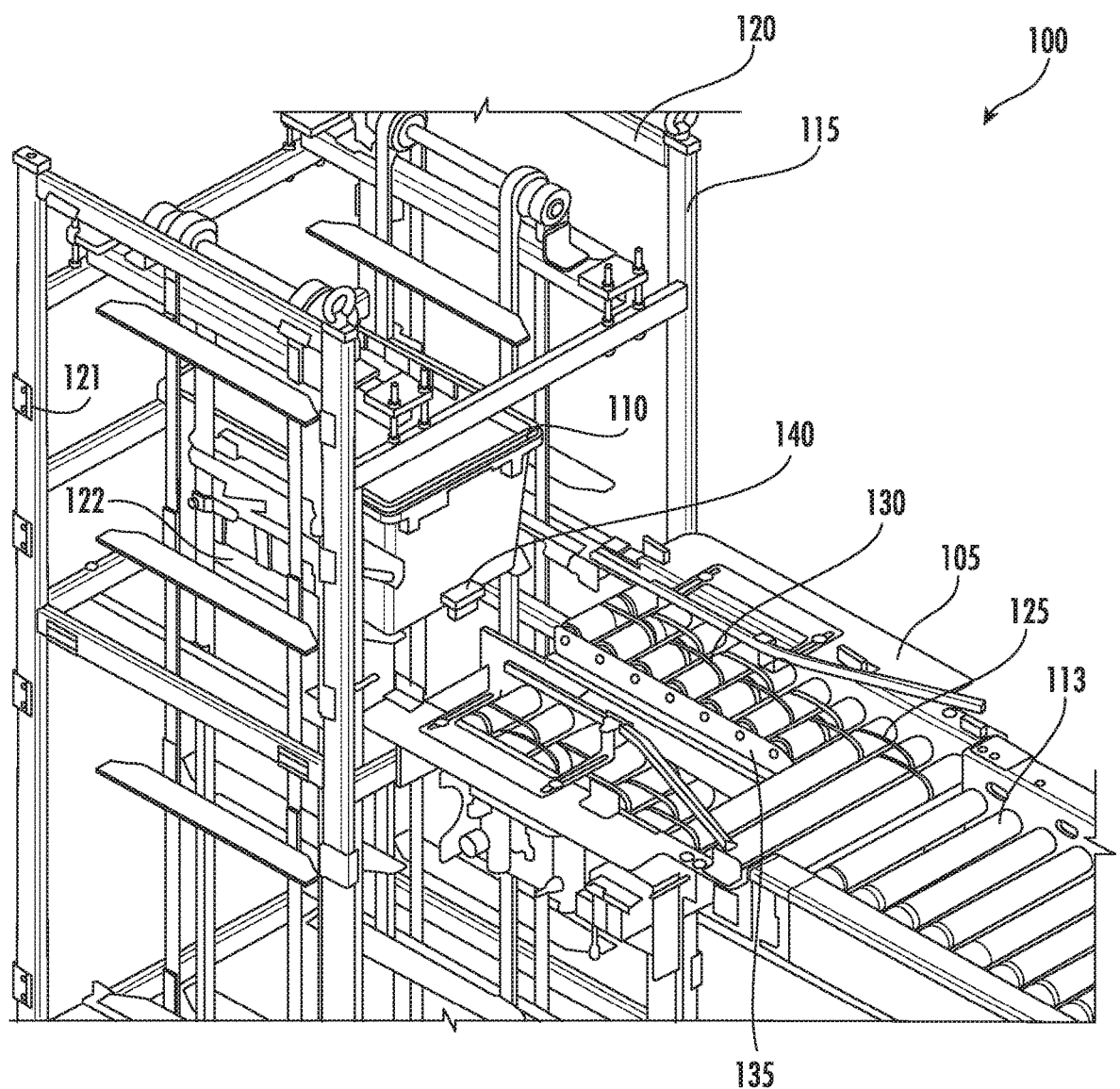
FIG. 1 illustrates a perspective view of a material handling system in accordance with an example embodiment of the present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art of the present disclosure that these concepts may be practiced without these specific details.

Example distribution and order fulfillment centers may include material handling systems for conveying, diverting, sorting, and/or organizing articles, such as, but not limited to, totes, containers, cartons, and the like. In some examples, material handling systems may transfer and/or load the articles from one material handling system to another material handling system, such as a material handling system that is adjacently positioned in the direction of travel of the material being handled (e.g., a downstream direction), for further handling and/or processing.

In some examples, the transfer and/or loading of the articles from one material handling system to a downstream material handling system may result in a loading error. For example, a conveyor may load a tote onto a downstream conveyor, however, the tote may be partially loaded, may bounce back and/or be reoriented during the loading operation, resulting in a jam on the downstream conveyor.

Further, in some examples, the downstream conveyor may also include a vertical conveyor. In such examples, loading errors may introduce down time for the system and may require that an operator clears jams at high elevations which requires additional safety measures to resolve, further increasing down time of the system.

One or more example embodiments of the present disclosure described herein include an efficient, cost-effective, and low-maintenance means, in some examples, for assisting in loading articles onto a downstream system. The load assist module described herein, in some examples, includes a pusher assembly having a track-guided vertical popup for pushing the articles fully and in a desired orientation, speed, etc. onto a downstream conveyor and/or machine.

FIG. 1 illustrates a perspective view of a material handling system 100, in accordance with one or more embodiments of the present disclosure. As shown in FIG. 1, the material handling system 100 may include a load assist module 105 for transferring an article 110, such as, a tote, onto a downstream conveyor 115. Further, in an embodiment, the downstream conveyor 115 may include a vertical conveyor 120, as shown in FIG. 1. The vertical conveyor 120 may be configured to convey articles vertically between one or more levels. In an example embodiment, the vertical conveyor 120 may include vertical uprights 121 for supporting a support structure 122. The support structure 122 may receive and/or support the article 110 received from the load assist module 105. Further, as shown in FIG. 1, the load assist module 105 may be installed as a stand-alone unit that is attached to an in line with existing conveyors, such as, conveyor 113. Alternatively or additionally, the load assist module 105 may be integral with or otherwise a part of one or more conveying systems.

In accordance with one or more example embodiments of the present disclosure, the load assist module 105 may include a roller conveyor 125 for receiving the article 110 from the conveyor 113. In an example embodiment, the roller conveyor 125 may be coplanar with the conveyor 113 to receive the article 110. The roller conveyor 125 may convey the article 110 along a conveyor plane 130 in the direction of the downstream conveyor 115, as shown in FIG. 1. The term conveyor plane 130, as used herein, may be defined as a conveyance surface defined by a surface of the rollers and is bounded by one or more edges of the rollers of the roller conveyor 125. In an example embodiment, when the downstream conveyor 115 includes the vertical conveyor 120, the support structure 122 may be coplanar with the roller conveyor 125 to support the article 110. It should be noted that the present disclosure is not limited to roller-based conveyors, and the term roller conveyor 115 may include or may otherwise take the form of any other means for conveying an article, such as, belted conveyor, strip belts, and the like.

In some examples, the load assist module 105 may include a pusher assembly 135 positioned adjacent the conveyor plane 130 and along the roller conveyor 125 in the downstream direction, as shown in FIG. 1. In some examples, the pusher assembly 135 may be place in the center or substantially the center of the roller conveyer 125. The pusher assembly 135 may include a track-guided vertical popup 140 that extends vertically in the downstream direction and that may be extendable above the conveyor plane 130 and may retractable below and/or in line with the conveyor plane 130. Further, the pusher assembly may drive the track-guided vertical popup 140 horizontally towards the downstream conveyor 115.

In an embodiment, the track-guided vertical popup 140 may be extendable above the conveyor plane 130 to contact the article 110, as shown in FIG. 1. As shown in FIG. 1, the track-guided vertical popup 140 is configured such that the track-guided vertical popup 140 pushes the article 110 onto the downstream conveyor 115 and loads the article 110 all the way into the vertical conveyor 120, thus, minimizing loading errors.

Figure 2:
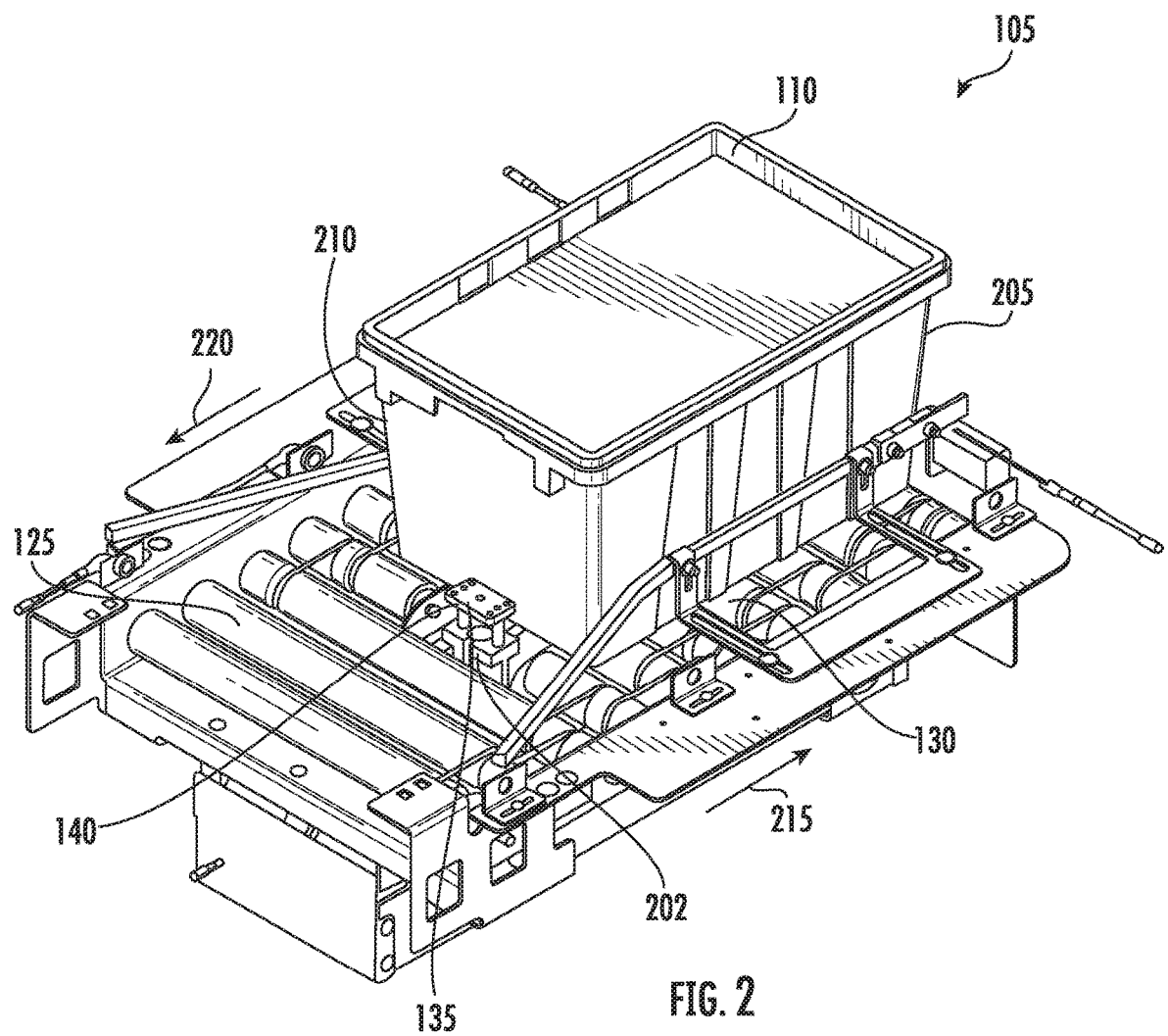
FIG. 2 illustrates a perspective view of a load assist module, in accordance with one or more example embodiments of the present disclosure.

FIG. 2 illustrates a perspective view of load assist module 105, in accordance with one or more example embodiments of the present disclosure. As shown in FIG. 2, the roller conveyor 125 includes the article 110, having a frond end 205 and a rear end 210, and is shown resting on the surface of the one or more rollers (e.g., the conveyor plane 130). Further, the load assist module 105 includes the pusher assembly 135 having the track-guided vertical popup 140 positioned adjacent the conveyor plane 130. As shown in FIG. 2, the track-guided vertical popup 140 may be positioned in an initial position 202, that is, the track-guided vertical popup 140 may be fully retracted into the load assist module 105 such that the track-guided vertical popup 140 may be positioned adjacent the rear end 210 of the article 110. Further, as shown in FIG. 2, the track-guided vertical popup 140 may extend vertically above the conveyor plane 130, by means of a pneumatic cylinder, for example, to contact the rear end 210 of the article 110 when the article 110 may be detected to be present on the roller conveyor 125 by one or more sensors of the load assist module 105. In an example embodiment, the pusher assembly 135 may drive the track-guided vertical popup 140 in a first direction 215 towards a downstream conveyor (not shown) for transferring the article 110 from the load assist module 105 onto the downstream conveyor. Further, in an example embodiment, the pusher assembly 135 may drive the track-guided vertical popup 140 in a second direction 220 away from a downstream conveyor (not shown) to retract the track-guided vertical popup 140 into the load assist module 105, for example, after transferring the article 110 onto the downstream conveyor. In an example embodiment, the track-guided vertical popup 140 may be retracted vertically to be adjacent the conveyor plane 130 before, while, and/or after being retracted into the load assist module 105 to allow a next article to be conveyed on the roller conveyor 125 without impeding conveyance of the next article.

Figure 3A:
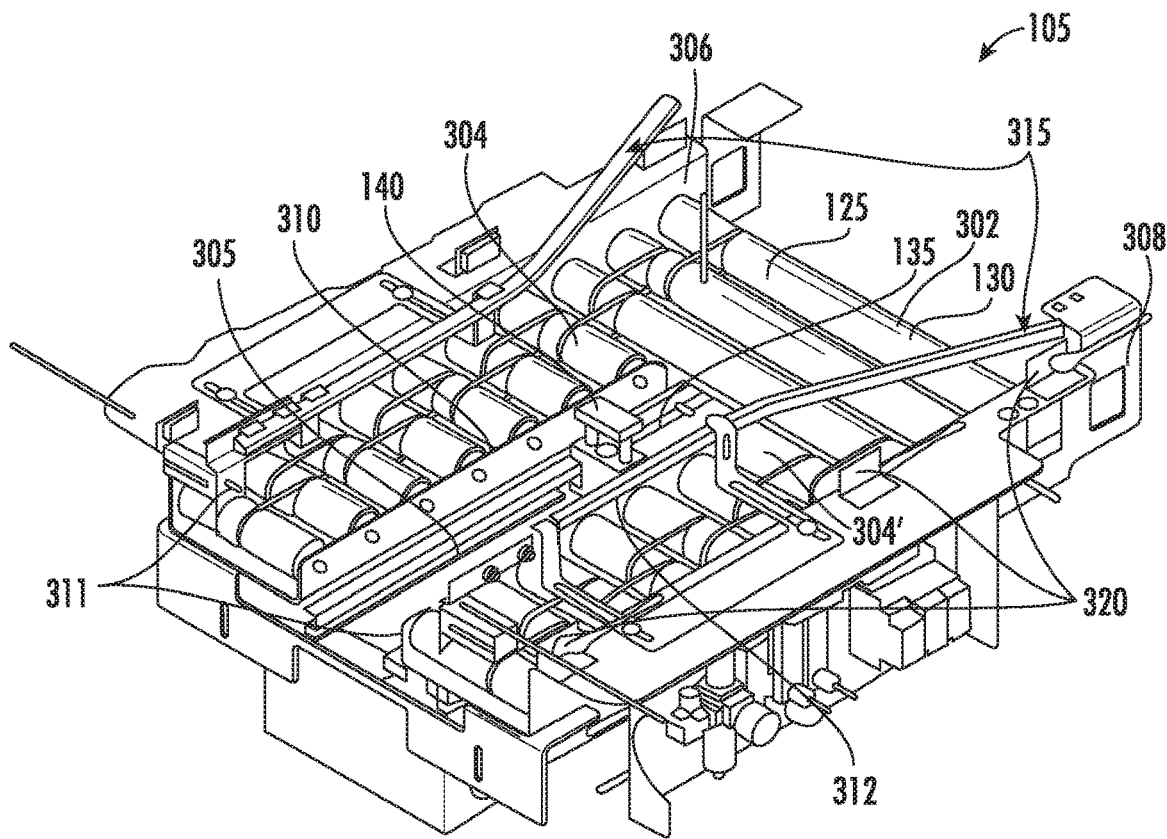
FIG. 3A illustrates a perspective view of the load assist module, in accordance with an example embodiment of the present disclosure.

FIG. 3A illustrates a perspective view of the load assist module 105, in accordance with one or more example embodiments of the present disclosure. As shown in FIG. 3A, the load assist module 105 includes the roller conveyor 125 for conveying an article (not shown) along the conveyor plane 130 towards a downstream conveyor (not shown). In this embodiment there are a first set of full length rollers 302 that extend from a first wall 306 to a second wall 308 of the load assist module 105. Adjacent to the first set of full length rollers 302 are two sets of short rollers 304 and 304'. The first set of short rollers 304 are bounded on a first side by the first wall 306 and a second side by wall 310 of the pusher assembly 135. The second set of short rollers 304' are bounded on a first side by the second wall 308 and a second side by wall 312 of the pusher assembly 135. In some examples, one or more rollers in the first set of short rollers 304 may be aligned in parallel with one or more rollers in the second set of short rollers 304'. The first set of full length rollers 302 and the two sets of short rollers 304 and 304' may be arranged in series so as to form a conveying surface defining the conveyor plane 130 that is configured to convey an article.

The load assist module 105 further includes the pusher assembly 135 having the track-guided vertical popup 140. The pusher assembly 135 is defined by opposing walls 310 and 312 that extend in a downstream direction from the first set of full length rollers 302 to a downstream end of the roller conveyor 125. In some examples, each wall 310 and 312 comprises a track 305. In some examples the track 305 is defined by the walls 310 and 312 whereas in other examples the track 305 extends from or is attached to the walls 310 and 312. In an example embodiment, track 305 on each wall 310 and 315 may be arranged such that they extend in the same plane and oppose one another. In some examples, track 305 may be sized to receive protrusions 335 and 335', as shown in FIG. 3C, that extends from track-guided vertical popup 140.

Figure 3B:
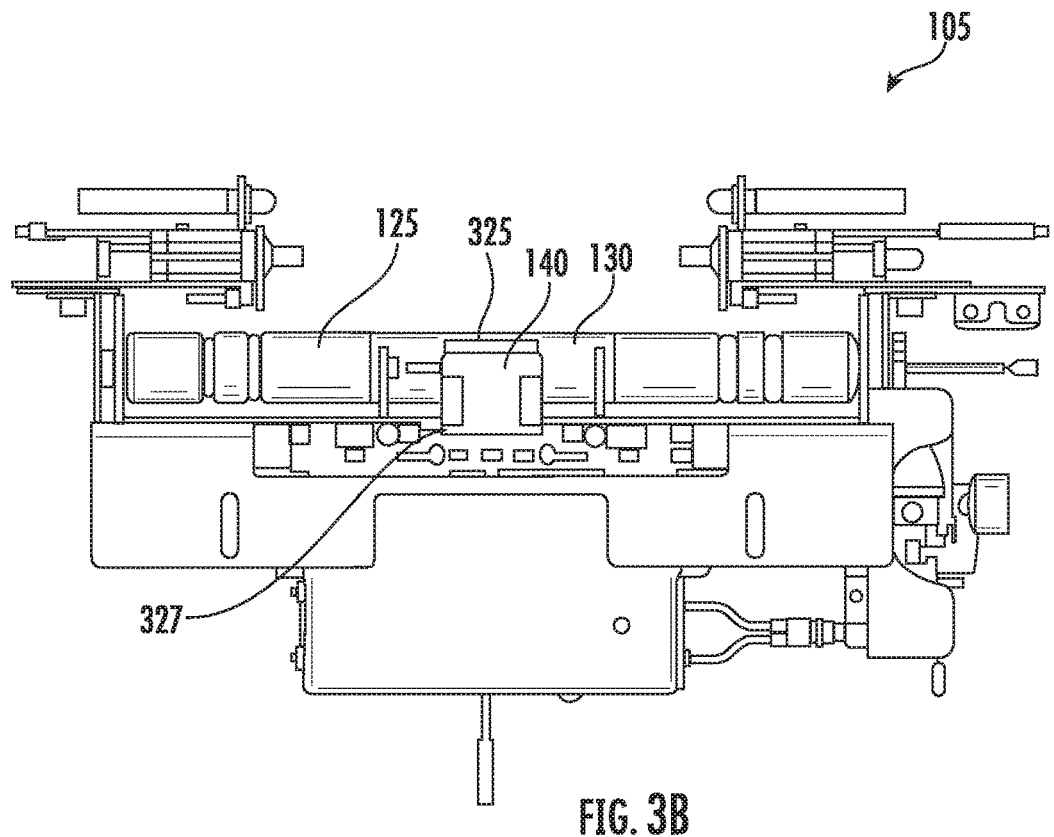
FIG. 3B illustrates a front view of the load assist module, in accordance with an example embodiment of the present disclosure.
Figure 3C:
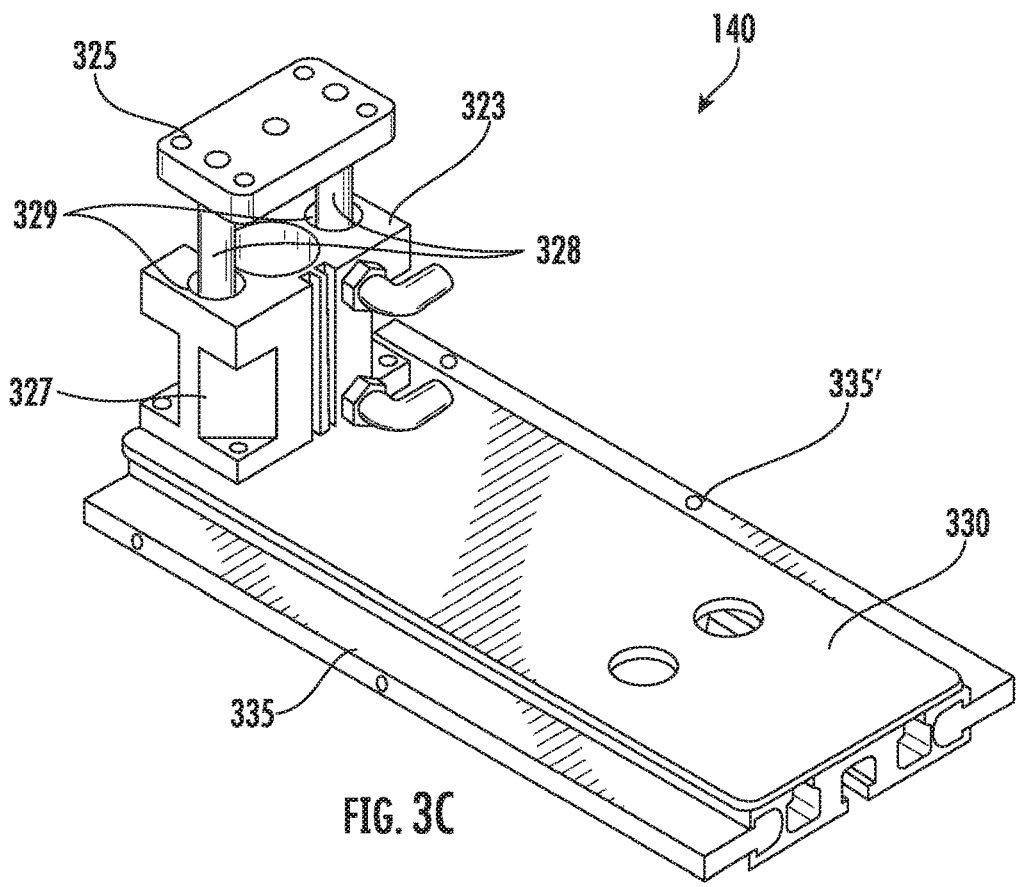
FIG. 3C illustrates a perspective view of a track-guided vertical popup in an extended position, in accordance with an example embodiment of the present disclosure.
Figure 3D:
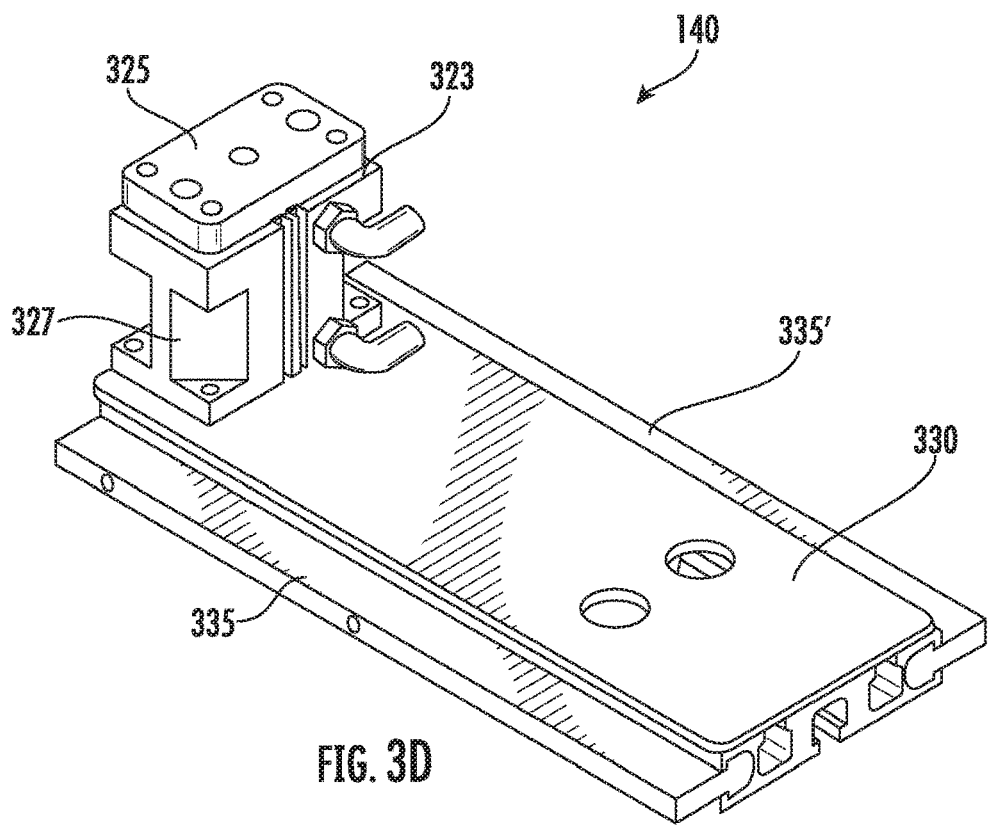
FIG. 3D illustrates a perspective view of the track-guided vertical popup in a retracted position, in accordance with an example embodiment of the present disclosure.

Referring now to FIGS. 3C and 3D, that illustrate perspective views of the track-guided vertical popup 140 in an extended position and a retracted position, in accordance with one or more example embodiments of the present disclosure. In this example embodiment, the track-guided vertical popup 140 comprises an elongate base 330. The base 330 may include protrusions 335 and 335' extending from both sides of the base 330. The protrusions 335 and 335' may be sized to fit in the channel and/or tracks defined by the walls of the pusher assembly, as described above. Base 330 may further comprise a vertical pop-up 323 having a pop-up head 325 coupled to a pop-up base 327. In some examples, the pop-up head 325 may be operatively coupled to a pneumatic cylinder such that the pop-up head 325 may be vertically movable relative to the base 330 and relative to a conveyor plane. Specifically, the pop-up head 325 may be coupled to the pop-up base 327 through pistons 328 movable pneumatically in and out of openings 329 formed in the pop-up base 327. Thus, enabling the pop-head 325 to extend from and/or retract into the pop-up base 327. FIG. 3C illustrates the track-guided vertical popup 140 with the pop-head 325 extending from the pop-up base 327. FIG. 3D illustrates the track-guided vertical popup 140 with the pop-head 325 retracting into the pop-up base 327.

Referring back to FIG. 3A, the track-guided vertical popup 140 may be extendable to be positioned above the conveyor plane 130 and may be retractable relative to the to be positioned in line with and/or below the conveyor plane 130 for receiving a next article onto the load assist module 105.

In an example embodiment, the load assist module 105 may further include opposing pneumatic pop-out stops 310 positioned at the downstream end of the load assist module 105 such that they are adjacent to a downstream conveyor, as shown in FIG. 3A. In an example embodiment, the pneumatic pop-out stops 310 may be coupled to one or more pneumatic cylinders, such that the pneumatic pop-out stops 310 may be extendable inwardly toward one another and, thus, may be configured to stop an article, until the downstream conveyor may be ready to receive the article. Further, the pneumatic pop-out stops 310 may be retractable to allow the article at a front of the load assist module 105 to be transferred onto the downstream conveyor, when the downstream conveyor may be ready to receive the article.

In an example embodiment, the load assist module 105 may further include guide rails 315 positioned parallel to the conveyor plane 130. Guide rails 315 may be attached to one or more supports that may extend in a perpendicular direction from the conveyor plane 130. In some examples, the guide rails 315 may be positioned such that they extend along the length of the conveyor plane 130 and are parallel to the roller conveyor 125. Further, in some examples, the guide rails 315 may be parallel to one another for a portion of their length and may curve outwardly away from one another for another portion of their length. The guide rails 315 may align and guide an article being conveyed on the roller conveyor 125 to a desired position and/or orientation. For example, the guide rails 315 may guide the article such that the article may be positioned above the pusher assembly 135.

In an example embodiment, the load assist module 105 may further include one or more sensors 320 mounted at different locations on the load assist module 105 to track the movement of the article on the load assist module 105. In an example embodiment, the sensors 320 may include, but are not limited to, photoeyes, encoders, proximity sensors, and the like.

In accordance with one or more example embodiments of the present disclosure, one or more sensors 320 positioned at a rear end of the load assist module 105 may detect that the roller conveyor 125 may be clear and ready to receive an article from an upstream conveyor. In response, the roller conveyor 125 may receive the article and convey the article along the conveyor plane 130 towards a downstream conveyor. While the article may be conveyed by the roller conveyor 125, the guide rails 315 may guide and align the article, such that the article may pass over the track-guided vertical popup 140 that may be in a retracted position. Further, in an example embodiment, the one or more sensors 320 may detect a presence of the article on the roller conveyor 125, and may actuate the pneumatic pop-out stops 310, such that the article may stop against the pneumatic pop-out stops 310. Further, once the downstream conveyor may be ready to receive the article, the pneumatic pop-out stops 310 may retract, and the roller conveyor 125 may start conveying the article towards the downstream conveyor. Further, the track-guided vertical popup 140 may extend above the conveyor plane 130 and may contact a rear end of the article. The pusher assembly 135 may drive the track-guided vertical popup 140 along the track 305 and against the rear end of the article, thus, pushing the article onto the downstream conveyor. In an example embodiment, once the article may be transferred onto the downstream conveyor, the track-guided vertical popup 140 may be retracted and be driven back into the load assist module 105 by the pusher assembly 135.

FIG. 3B illustrates a front view of the load assist module 105, in accordance with one or more example embodiments of the present disclosure. As shown in FIG. 3B, the track-guided vertical popup 140 may be retracted vertically, such that, the pop-up head 325 may be retracted into the pop-up base 327 and be in line with and/or below a top surface of the roller conveyor 125. That is, the pop-up head 325 may be adjacent the conveyor plane 130, so as to allow an article to be conveyed on the roller conveyor 125 without being impeded by the track-guided vertical popup 140.

Figure 4A:
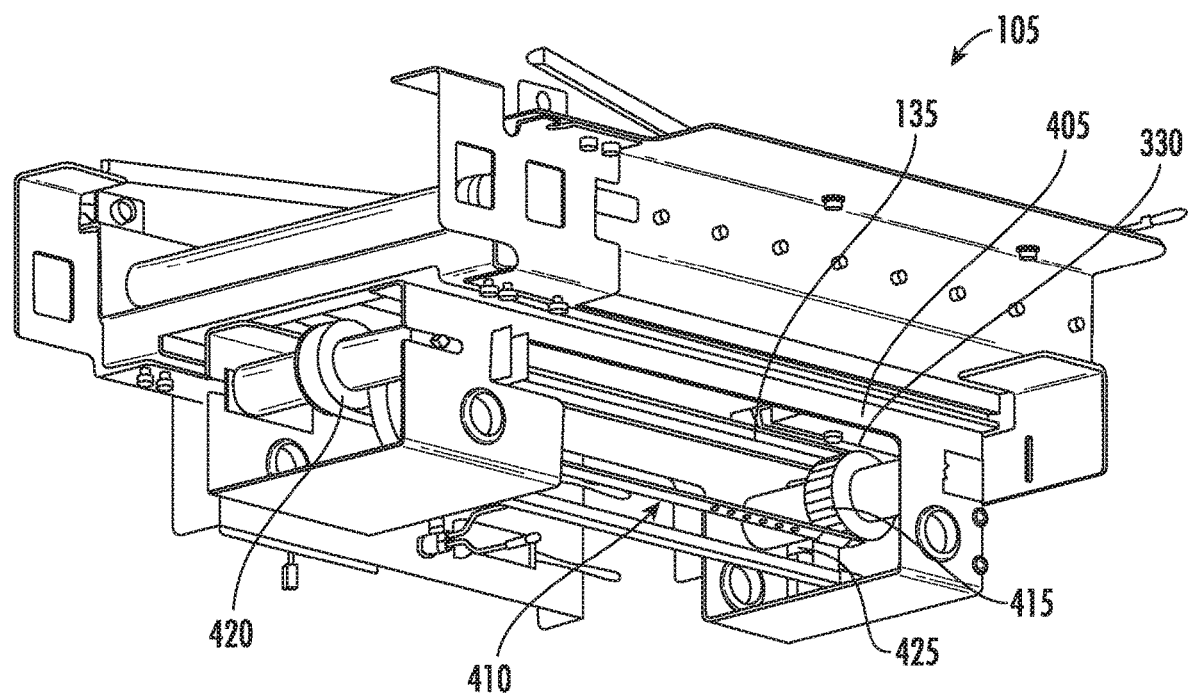
FIG. 4A illustrates a bottom view of the load assist module, in accordance with an example embodiment of the present disclosure.

FIG. 4A illustrates a bottom view of the load assist module 105, in accordance with one or more example embodiments of the present disclosure. As shown in FIG. 4A, the pusher assembly 135 of the load assist module 105 may include a drive assembly 405 operatively coupled to the track-guided vertical popup (not shown) for driving the track-guided vertical popup, as described above. In an example embodiment, the drive assembly 405 may include a first roller mounted timing pulley 415 and a second roller mounted timing pulley 420, as shown in FIG. 4A. In an example embodiment, the first roller mounted timing pulley 415 may be mounted on a motorized roller and the second roller mounted timing pulley 420 may be mounted on an idler roller. The drive assembly 405 may further include a timing belt 410 reeved around and driven by the first roller mounted timing pulley 415 and the second roller mounted timing pulley 420.

The timing belt 410 may be coupled to the base 330 of the track-guided vertical popup 140 (not shown) of the pusher assembly 135, such that, as the timing belt 410 may be driven by the first roller mounted timing pulley 415 and the second roller mounted timing pulley 420, the track-guided vertical popup 140 may be driven along with the timing belt 410. For example, the first roller mounted timing pulley 415 may be rotated in a first direction to drive the timing belt 410 forward, towards the downstream conveyor. The timing belt 410 may, in turn, drive the track-guided vertical popup 140 (not shown) that may be coupled to the timing belt 410 towards the downstream conveyor. Further, the first roller mounted timing pulley 415 may be rotated in a second direction, opposite to the first direction, to drive the timing belt 410 backwards, away from the downstream conveyor, thus, moving the track-guided vertical popup 140 back into the load assist module 105.

Further, in an example embodiment, the drive assembly 405 may include a flag 425 coupled to the timing belt 410, as shown in FIG. 4A. The flag 425 may be coupled to an underside of the timing belt 410, such that the flag 425 may move in a direction opposite to a direction of motion of the timing belt 410. Further, in an example embodiment, the load assist module 105 may include one or more sensors, such as, but not limited to, proximity sensors, photoeyes, encoders, etc., that may detect the flag 425 to determine a position of the timing belt 410. For example, the flag 425 may move between sensors mounted on each end of the load assist module 105, such that, the sensors may detect a position of the flag 425. In an example embodiment, based on the sensor data, the load assist module 105 may determine a position of the timing belt 410, and subsequently, a position of the track-guided vertical popup that may be coupled to the timing belt 410.

Figure 4B:
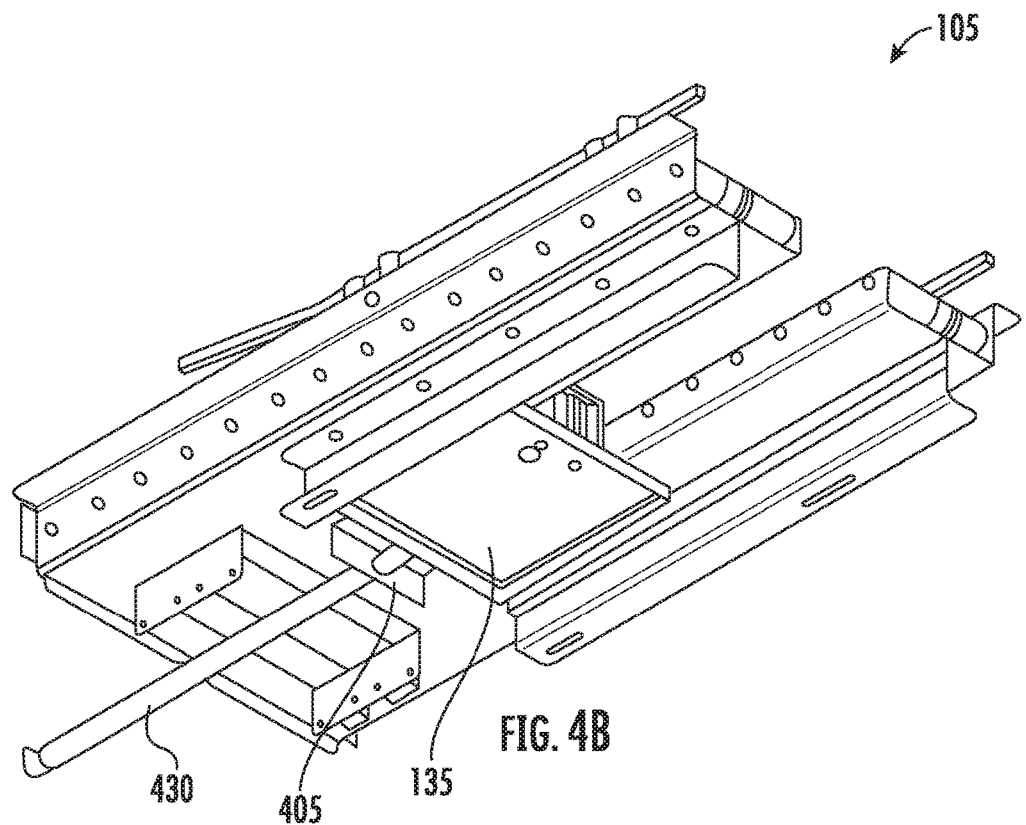
FIG. 4B illustrates a bottom view of the load assist module, in accordance with another example embodiment of the present disclosure.

FIG. 4B illustrates a bottom view of the load assist module 105, in accordance with another example embodiment of the present disclosure. In an alternate embodiment, as shown in FIG. 4B, the drive assembly 405 may include a pneumatic cylinder 430 coupled to the track-guided vertical popup (not shown) of the pusher assembly 135. In an example embodiment, the pneumatic cylinder 430 may extend to drive the track-guided vertical popup towards the downstream conveyor and may retract to drive the track-guided vertical popup away from the downstream conveyor and back into the load assist module 105.

Figure 5:
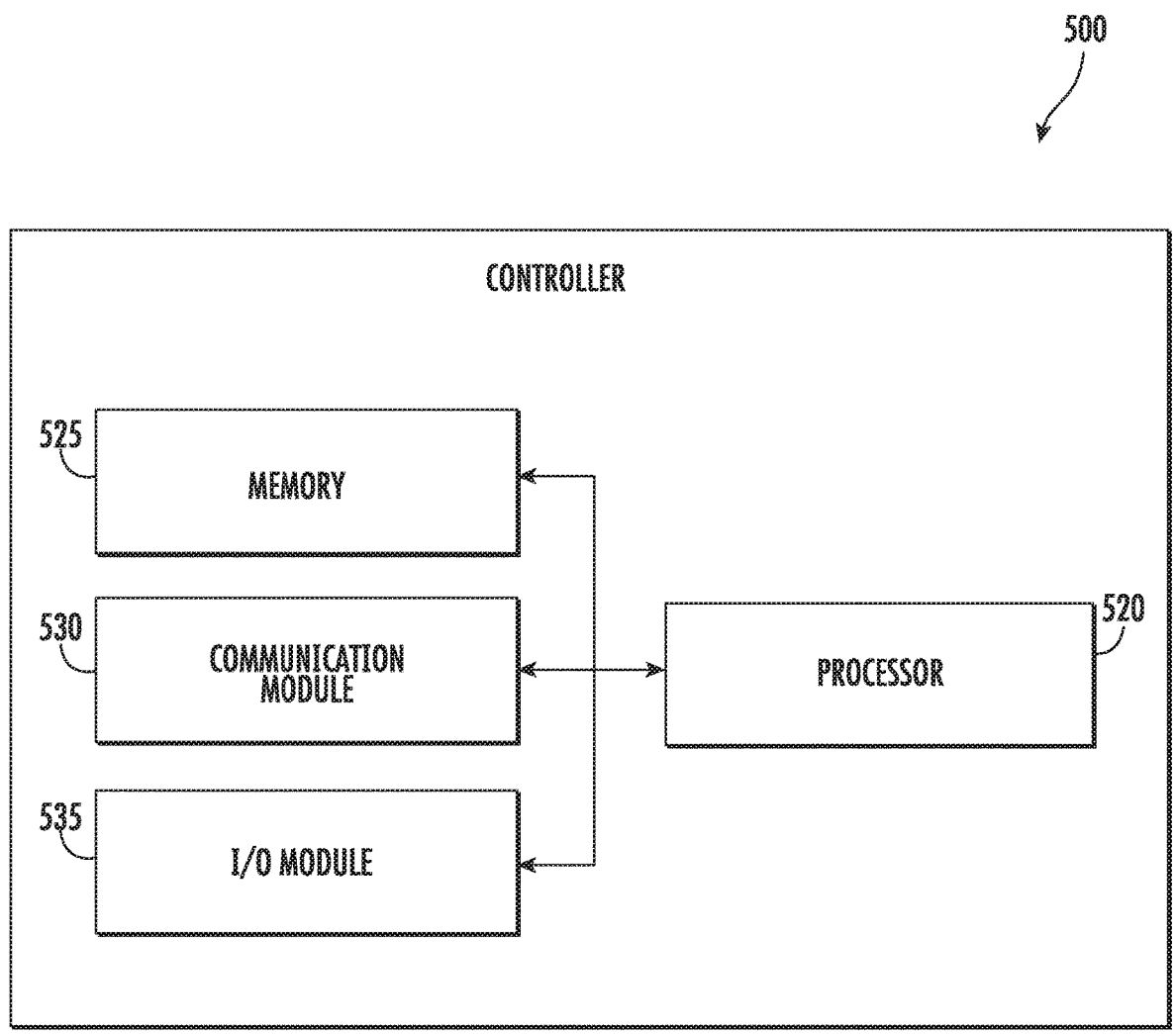
FIG. 5 illustrates a schematic block diagram of a controller of the material handling system, in accordance with one or more embodiments of the present disclosure.

FIG. 5 illustrates a schematic block diagram of a controller 500 for controlling the operation of the load assist module 105, in accordance with one or more embodiments of the present disclosure. As shown, the controller 500 may include at least one processor 520, memory 525, communication module 530, and input/output module 535. The processor 520 may be configured with processor executable instructions to perform operations described herein. Processor 520 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments processor 520 may comprise a plurality of processors. The plurality of processors may be embodied on a single device or may be distributed across a plurality of devices. The plurality of processors may be in operative communication with each other and may be collectively configured to perform one or more functionalities of the controller 500 as described herein. In an example embodiment, processor 520 is configured to execute instructions stored in memory 525 or otherwise accessible to processor 520. These instructions, when executed by processor 520, may cause controller 500 to perform one or more of the functionalities of controller 500, as will be described with reference to FIG. 6.

Memory 525 may comprise, for example, volatile memory, non-volatile memory, or some combination thereof. Although illustrated in FIG. 5 as a single memory, memory 525 may comprise a plurality of memory components. The plurality of memory components may be embodied on a single device or distributed across a plurality of devices. In various embodiments, memory 525 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 525 may be configured to store information, data (including item data and/or profile data), applications, instructions, or the like for enabling controller 500 to carry out various functions in accordance with example embodiments of the present invention. For example, in at least some embodiments, memory 525 may buffer input data for processing by processor 520. Additionally or alternatively, in at least some embodiments, memory 525 may store program instructions for execution by processor 520. Memory 525 may store information in the form of static and/or dynamic information. This stored information may be stored and/or used by the controller 500 during the course of performing its functionalities.

Communications module 530 may be embodied as any device or means embodied in circuitry, hardware, a computer program product comprising computer readable program instructions stored on a computer readable medium (e.g., memory 525) and executed by a processing device (e.g., processor 520), or a combination thereof that is configured to receive and/or transmit data from/to another device and/or network, such as, for example, sensors, roller conveyor 125, pusher assembly 135, drive assembly 405, and the like. In some embodiments, communications module 530 (like other components discussed herein) may be at least partially embodied as or otherwise controlled by processor 520. In this regard, communications module 530 may be in communication with processor 520, such as via a bus. Communications module 530 may include, for example, an antenna, a transmitter, a receiver, a transceiver, network interface card and/or supporting hardware and/or firmware/software for enabling communications with another device. Communications module 530 may be configured to receive and/or transmit any data that may be stored by memory 525 using any protocol that may be used for communications between devices. Communications module 530 may additionally or alternatively be in communication with the memory 525, input/output module 535 and/or any other component of the controller 500, such as via a bus.

Input/output module 535 may be in communication with processor 520 to receive an indication of a user input and/or to provide an audible, visual, mechanical, or other output to a user. As such, input/output module 535 may include support, for example, for a keyboard, a mouse, a joystick, a display, a touch screen display, a microphone, a speaker, a RFID reader, barcode reader, biometric scanner, and/or other input/output mechanisms. In embodiments wherein the controller 500 is embodied as a server or database, aspects of input/output module 535 may be reduced as compared to embodiments where the controller 500 is implemented as an end-user machine (e.g., remote worker device and/or employee device) or other type of device designed for complex user interactions. In some embodiments (like other components discussed herein), input/output module 535 may even be eliminated from the controller 500. Alternatively, such as in embodiments wherein the controller 500 is embodied as a server or database, at least some aspects of input/output module 535 may be embodied on an apparatus used by a user that is in communication with the controller 500. Input/output module 535 may be in communication with the memory 525, communications module 530, and/or any other component(s), such as via a bus. One or more than one input/output module and/or other component can be included in the controller 500.

As described above and as will be appreciated based on this disclosure, embodiments of the present invention may be configured as methods, conveyors, material handling systems, warehouse management servers, personal computers, servers, mobile devices, backend network devices, and the like. Accordingly, embodiments may comprise various means formed entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described below with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 520, as discussed above with reference to FIG. 5, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 525) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Figure 6:
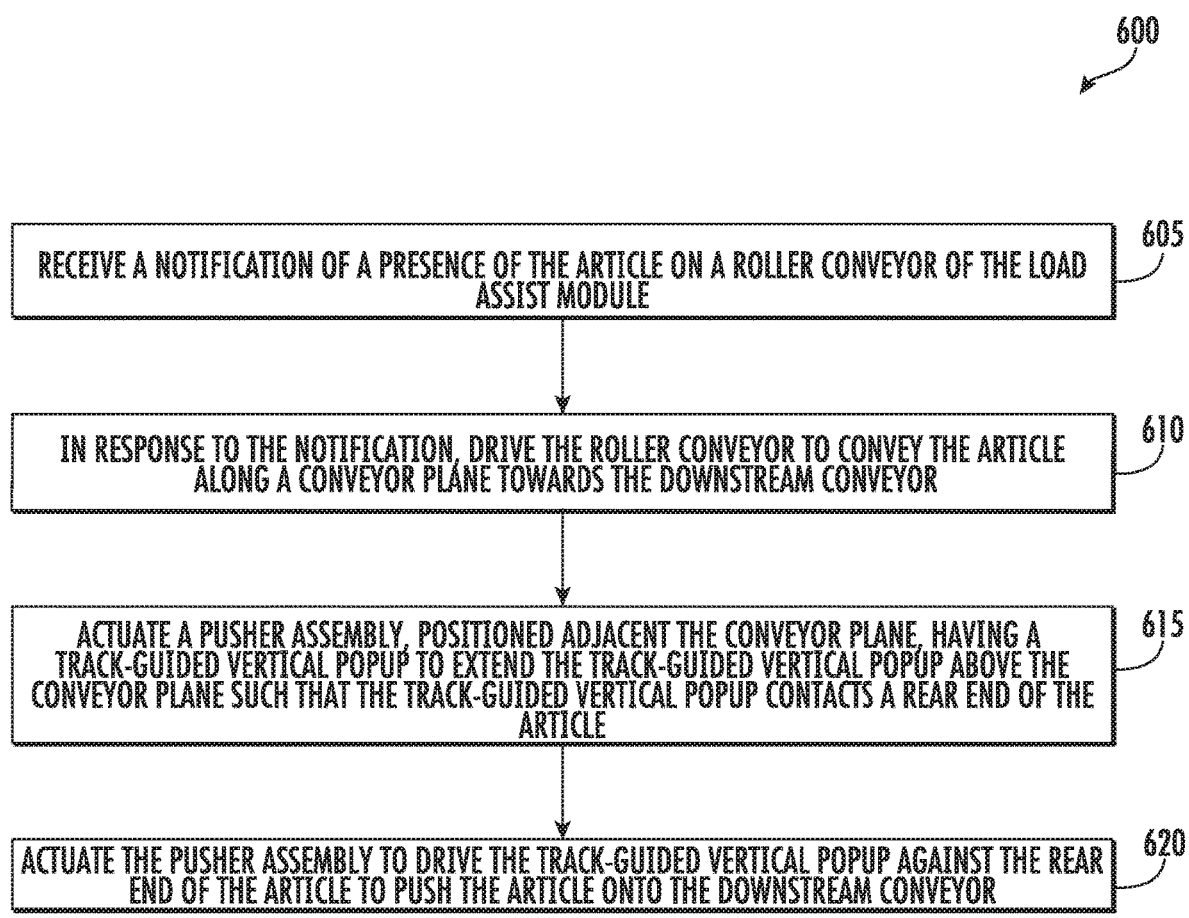
FIG. 6 illustrates an example method for operating the load assist module, in accordance with one or more embodiments of the present disclosure.

FIG. 6 illustrates an example method 600 for operating the load assist module 105, in accordance with one or more embodiments of the present disclosure. The method 600 may include, at block 605, receiving, by the material handling system 100, the load assist module 105, and/or the controller 500, a notification of a presence of the article 110 on a roller conveyor 125 of the load assist module 105. In an exemplary embodiment, as described above with reference to FIGS. 1 and 3A, the roller conveyor 125 may receive the article 110 from an upstream conveyor. Further, one or more sensors 320 may detect a presence of the article 110 on the roller conveyor 125 and may provide a notification of the presence of the article 110 on the roller conveyor 125 to the material handling system 100, the load assist module 105, and/or the controller 500. As described above, the one or more sensors 320 may include photoeyes, proximity sensors, encoders, etc. for detecting a presence of the article 110 on the roller conveyor 125.

In response to the notification, the method 600 may further include driving, by the material handling system 100, the load assist module 105, and/or the controller 500, the roller conveyor 125 to convey the article 110 along a conveyor plane 130 towards the downstream conveyor, at block 610. The method 600 further includes actuating, by the material handling system 100, the load assist module 105, and/or the controller 500, a pusher assembly 135, positioned adjacent the conveyor plane 130, having a track-guided vertical popup 140 to extend the track-guided vertical popup 140 above the conveyor plane 130 such that the track-guided vertical popup 140 contacts a rear end of the article 110, at block 615, as described above with reference to FIGS. 1 to 4B.

The method 600 may further include actuating, by the material handling system 100, the load assist module 105, and/or the controller 500, the pusher assembly 135 to drive the track-guided vertical popup 140 against the rear end of the article 110 to push the article 110 onto the downstream conveyor, at block 620, as described above with reference to FIGS. 1 and 2.

Thus, the material handling system 100 including the load assist module 105 may transfer and/or load articles onto the downstream conveyors efficiently, thereby reducing, in some examples, loading errors, such as, bounce back, incomplete loading, etc.

It must be noted that, as used in this specification and the appended claims, the singular forms "a," "an," and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A load assist module for transferring an article onto a downstream conveyor, the load assist module comprising:
　a roller conveyor comprising one or more rollers that together define a conveyor plane, wherein the one or more rollers are actuatable to convey the article along the conveyor plane in a direction of a downstream conveyor;
　a pusher assembly that is positioned adjacent to the conveyor plane, wherein the pusher assembly comprises a track-guided vertical popup with a base and a pop-up, wherein the pop-up is actuatable such that the pop-up extends through the conveyor plane to contact the article, wherein the pusher assembly is configured to drive the track-guided vertical popup toward the direction of the downstream conveyor such that the track-guided vertical popup pushes the article; and
　one or more pneumatic pop-out stops positioned adjacent to the downstream conveyor, such that the one or more pneumatic pop-out stops extend to stop the article against the one or more pneumatic pop-out stops until the downstream conveyor is ready to receive the article.

2. The load assist module of claim 1, wherein the pusher assembly further comprises a drive assembly operatively coupled to the track-guided vertical popup, wherein the drive assembly:
　drives the track-guided vertical popup in a first direction, towards the downstream conveyor, to transfer the article onto the downstream conveyor; and
　drives the track-guided vertical popup in a second direction, away from the downstream conveyor, once the article is transferred onto the downstream conveyor.

3. The load assist module of claim 2, wherein the drive assembly comprises a timing belt driven by a pair of roller mounted timing pulleys, wherein the timing belt is coupled to the track-guided vertical popup for driving the track-guided vertical popup in the first direction and the second direction.

4. The load assist module of claim 3, wherein the drive assembly further comprises a flag coupled to the timing belt such that the flag moves in a direction opposite to a direction of movement of the track-guided vertical popup.

5. The load assist module of claim 1, wherein the track-guided vertical popup comprises a popup head operatively coupled to a base, such that the popup head is vertically movable to extend above the conveyor plane for pushing the article onto the downstream conveyor and retract below the conveyor plane for receiving a next article onto the load assist module.

6. The load assist module of claim 1, further comprising a controller operatively coupled to the roller conveyor and the pusher assembly, wherein the controller is configured to:
receive a notification of a presence of the article on the roller conveyor;
in response to the notification, drive the roller conveyor to convey the article along the conveyor plane towards the downstream conveyor;
actuate the pusher assembly to extend the track-guided vertical popup above the conveyor plane such that the track-guided vertical popup contacts the rear end of the article; and
actuate the pusher assembly to drive the track-guided vertical popup against the rear end of the article to push the article onto the downstream conveyor.

7. The load assist module of claim 1, further comprising one or more guide rails positioned parallel to the conveyor plane for aligning and guiding the article while the article is being conveyed by the roller conveyor.

8. A material handling system, comprising:
a conveyor for conveying an article in a conveyance direction; and
a load assist module positioned adjacent the conveyor for receiving the article from the conveyor, the load assist module comprising:
a roller conveyor comprising one or more rollers that together define a conveyor plane, wherein the one or more rollers are actuatable to convey the article along the conveyor plane in a direction of a downstream conveyor in response to receiving a notification of a presence of the article on the roller conveyor; and
a pusher assembly that is positioned adjacent to the conveyor plane, wherein the pusher assembly comprises a track-guided vertical popup with a base and a pop-up, wherein the pop-up is actuatable such that it extends through the conveyor plane to contact the article, wherein the pusher assembly is configured to drive the track-guided vertical popup toward the direction of the downstream conveyor such that the track-guided vertical popup pushes the article.

9. The material handling system of claim 8, wherein the downstream conveyor includes a vertical conveyor for moving the article vertically across one or more levels.

10. The material handling system of claim 8, wherein the pusher assembly further comprises a drive assembly operatively coupled to the track-guided vertical popup, wherein the drive assembly:
drives the track-guided vertical popup in a first direction, towards the downstream conveyor, to transfer the article onto the downstream conveyor; and
drives the track-guided vertical popup in a second direction, away from the downstream conveyor, once the article is transferred onto the downstream conveyor.

11. The material handling system of claim 10, wherein the drive assembly comprises a timing belt driven by a pair of roller mounted timing pulleys, wherein the timing belt is coupled to the track-guided vertical popup for driving the track-guided vertical popup in the first direction and the second direction.

12. The material handling system of claim 11, wherein the drive assembly further comprises a flag coupled to the timing belt such that the flag moves in a direction opposite to a direction of movement of the track-guided vertical popup.

13. The material handling system of claim 8, wherein the popup is vertically movable to extend above the conveyor plane for pushing the article onto the downstream conveyor and retract below the conveyor plane for receiving a next article onto the load assist module.

14. The material handling system of claim 8, further comprising a controller operatively coupled to the load assist module, wherein the controller is configured to:
receive the notification of the presence of the article on the roller conveyor;
actuate the pusher assembly to extend the track-guided vertical popup above the conveyor plane such that the track-guided vertical popup contacts the rear end of the article; and
actuate the pusher assembly to drive the track-guided vertical popup against the rear end of the article to push the article onto the downstream conveyor.

15. A method of operating a load assist module for transferring an article onto a downstream conveyor, the method comprising:
receiving a notification of a presence of the article on a roller conveyor of the load assist module;
in response to the notification, driving the roller conveyor to convey the article along a conveyor plane towards the downstream conveyor;
actuating a pusher assembly, positioned adjacent the conveyor plane, having a track-guided vertical popup to extend the track-guided vertical popup above the conveyor plane such that the track-guided vertical popup contacts a rear end of the article; and
actuating the pusher assembly to drive the track-guided vertical popup against the rear end of the article to push the article onto the downstream conveyor.

16. The method of claim 15, further comprising:
receiving a notification of transfer of the article onto the downstream conveyor;
in response to the notification, actuating the pusher assembly to retract the track-guided vertical popup adjacent the conveyor plane; and
actuating the pusher assembly to drive the track-guided vertical popup away from the downstream conveyor and into the load assist module to an initial position.

17. The method of claim 15, further comprising:
receiving a notification of conveyance of the article on the roller conveyor towards the downstream conveyor;
actuating one or more pneumatic pop-out stops positioned adjacent to the downstream conveyor, such that the one or more pneumatic pop-out stops extend to stop the article against the one or more pneumatic pop-out stops;
detecting that the downstream conveyor is ready to receive the article; and
actuating the one or more pneumatic pop-out stops to retract to allow the article to be transferred onto the downstream conveyor.

* * * * *